May 9, 1933.  R. R. POTTER  1,907,577
CONTROL DEVICE
Filed Aug. 12, 1931
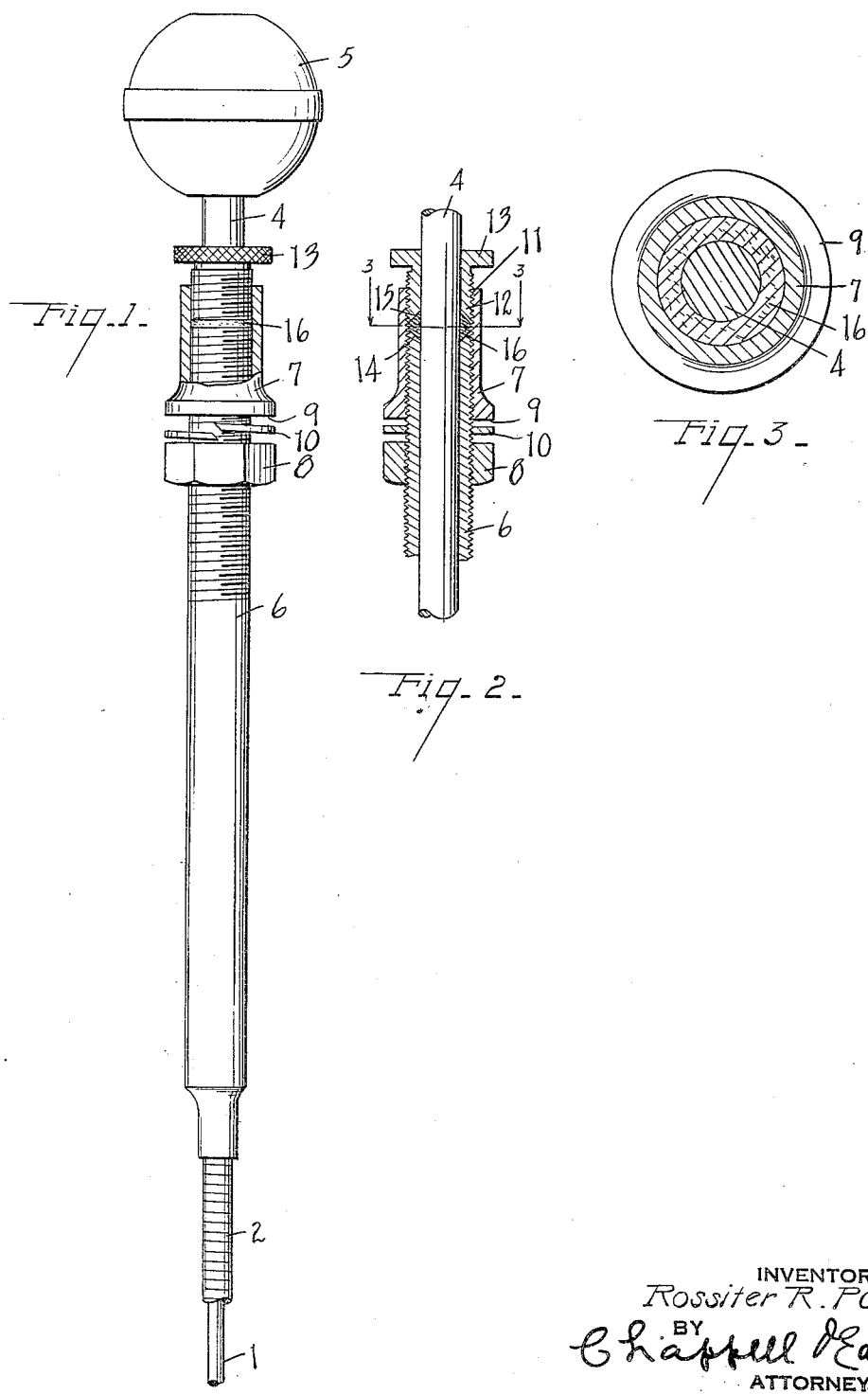
INVENTOR
Rossiter R. Potter
BY
Chappell & Earl
ATTORNEYS

UNITED STATES PATENT OFFICE

ROSSITER R. POTTER, OF KALAMAZOO, MICHIGAN, ASSIGNOR TO SHAKESPEARE PRODUCTS COMPANY, OF KALAMAZOO, MICHIGAN

CONTROL DEVICE

Application filed August 12, 1931. Serial No. 556,602.

The main objects of my invention are:

First, to provide an improved control device for the choke valves of carburetors and the like.

Second, to provide an improved control mechanism of this class, which is very simple and economical in its parts.

Third, to provide a control mechanism having means associated therewith for maintaining the control rod in any adjusted position within its scope of adjustment.

Fourth, to provide means for obviating rattling in a control mechanism of this type.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary side elevation of my improved control device.

Fig. 2 is a fragmentary detail view partially in longitudinal section, and

Fig. 3 is an enlarged transverse section on line 3—3 of Fig. 2.

Referring to the drawing, 1 represents a control wire which is arranged through a supporting sheath or Bowden tube 2. The control wire 1 is connected at its outer end in any suitable manner to the device which is to be controlled (not shown), and the inner end is connected to the head piece 4 having a spherical finger piece or grip 5 disposed in front of the instrument board or dash (not shown) within the reach of the operator.

The head piece 4 is mounted for longitudinal sliding adjustment in the tubular supporting member 6, the outer periphery of which is threaded for the accommodation of an internally threaded sleeve or nut 7 and the clamping nut 8. One end of the sleeve 7 is enlarged so as to constitute an abutment 9 for engaging the dash or other support for the control mechanism. The lock watcher 10 is provided for holding the sleeve 7 and the nut 8 in position after they have been tightened against opposite sides of the instrument board.

The other end of the sleeve 7 extends beyond the end of the supporting member 8 and constitutes an internally threaded socket 11 for the accommodation of the adjusting nut 12 which is provided with a narrow flange-like finger piece 13.

The opposed ends 14 and 15 of the supporting member 6 and the adjusting nut 12, respectively, are inwardly tapered or made conical so as to provide seats for the ring 16 of friction material which encircles the control rod 4 between said seats.

The friction ring or washer 16 is preferably of cork or other suitable material such as felt or leather or a molded composition. The friction ring engages the control rod so that it may be set at any desired position without the possibility of loosening even where the mechanism is vibrated as in motor vehicles. The engagement of the friction ring with the control rod also obviates rattling between this part and the other parts of the mechanism. The position of the rod may be adjusted longitudinally, silently, and with practically no wear upon the relatively movable parts. The frictional engagement between the friction ring and the head member is regulated by adjuntment of the member 12.

The resilient friction ring should be of an outside diameter slightly greater than the inside diameter of the chamber formed by the supporting member for the control rod, and the diameter of the hole in the packing ring or washer should be slightly smaller than the diameter of the control rod. These differences in sizes between the parts give an initial tension which is highly desirable even with the adjusting nut, and the friction may be increased by the adjustable nut to take up wear on the material in service.

Inasmuch as the head member is positively maintained in an adjusted position, it may be used to adjust the controlled device by moving it either inwardly or outwardly.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent is:

1. In a control mechanism, the combination of a tubular support, a control rod head mounted in said support for longitudinal adjustment therein, a sleeve threaded upon said support to project beyond the same and constituting a friction member chamber and an instrument board abutment, a nut threaded into the outer end of said sleeve, a ring of friction material encircling said rod within said chamber and supported on opposite sides by said support and nut, and a nut threaded on said support in opposed relation to said sleeve for clamping the same upon an instrument board or the like.

2. In a control mechanism, the combination with a control rod head member provided with a finger piece, of a tubular supporting member in which said head member is mounted for longitudinal movement, a sleeve threaded upon said support member and constituting a dash abutment, said sleeve having a portion extending beyond the end of said support and constituting a socket, a nut threaded into said sleeve and having a finger piece at its outer end, said head member projecting through said nut, said sleeve and nut having opposed conical ends providing friction member seats, and a friction ring encircling said head member between said seats for frictionally holding said head member in its adjusted positions and preventing rattling thereof.

In witness whereof I have hereunto set my hand.

ROSSITER R. POTTER.